United States Patent [19]
Smith

[11] Patent Number: 5,290,060
[45] Date of Patent: Mar. 1, 1994

[54] HYBRID GAS GENERATOR FOR AIR BAG INFLATABLE RESTRAINT SYSTEMS

[75] Inventor: Bradley W. Smith, Ogden, Utah

[73] Assignee: Morton International, Inc., Chicago, Ill.

[21] Appl. No.: 989,854

[22] Filed: Dec. 14, 1992

[51] Int. Cl.$^5$ .............................................. B60R 21/26
[52] U.S. Cl. ..................................... 280/737; 222/3; 137/682
[58] Field of Search ............... 280/728, 737, 741, 740; 222/3; 422/164, 165, 166; 137/68.2

[56] References Cited

U.S. PATENT DOCUMENTS

| | | | |
|---|---|---|---|
| 3,232,481 | 2/1966 | Hebenstreit | 222/3 |
| 3,552,770 | 1/1971 | Berryman | 280/740 |
| 3,655,217 | 4/1972 | Johnson | 280/737 |
| 3,756,621 | 9/1973 | Lewis et al. | |
| 3,853,332 | 12/1974 | Lynch | 422/166 |
| 3,877,721 | 4/1975 | Brown, Jr. | |
| 4,095,624 | 6/1978 | Davis | 141/18 |
| 4,296,084 | 10/1981 | Adams et al. | 422/166 |
| 4,561,675 | 12/1985 | Adams et al. | 280/741 |
| 5,016,914 | 5/1991 | Faigle et al. | 280/741 |
| 5,022,674 | 6/1991 | Frantom et al. | 280/741 |
| 5,031,932 | 7/1991 | Frantom et al. | 280/741 |
| 5,033,772 | 7/1991 | Frantom et al. | 280/737 |
| 5,076,607 | 12/1991 | Woods et al. | 280/737 |
| 5,131,680 | 7/1992 | Coultas et al. | 280/737 |

FOREIGN PATENT DOCUMENTS 2330194  6/1973  Fed. Rep. of Germany ...... 280/740

Primary Examiner—Karin L. Tyson
Attorney, Agent, or Firm—Gerald K. White

[57] ABSTRACT

A gas generator includes a chamber in which inert gas under high pressure is stored, a diffuser chamber, and a chamber containing a pyrotechnic heater and initiator. Upon receiving an electrical signal the initiator fires igniting the pyrotechnic charge. As pressure in the combustion chamber of the pyrotechnic heater rises and exceeds the storage chamber pressure, a plug in a shoulder covering the pyrotechnic nozzle orifice is unseated, subsequently rupturing a thin metal sealing diaphragm since the latter is unsupported for a pressure differential in this direction. Hot gas and particles from the burning pyrotechnic heat the stored gas causing a rapid pressure rise in the storage chamber. When the storage chamber pressure exceeds the structural capability of a thin metal disc between the diffuser and storage chambers, it ruptures allowing the heated gas to vent through the diffuser orifices into the air bag assembly.

14 Claims, 6 Drawing Sheets

HYBRID GAS GENERATOR FOR AIR BAG INFLATABLE RESTRAINT SYSTEMS

BACKGROUND OF THE INVENTION

1. Field of the Invention

This invention relates to an inflator for an air bag, and more particularly, to the type of inflator known as a hybrid inflator.

2. The Related Art

Many types of inflators have been disclosed in the art for inflating an air bag for use in an inflatable restraint system. One involves the utilization of a quantity of stored compressed gas which is selectively released to inflate the air bag. Another derives a gas source from a combustible gas generating material which, upon ignition, generates a quantity of gas sufficient to inflate the air bag. In a third type, the air bag inflating gas results from a combination of stored compressed gas and a gas generating material. The last mentioned type is commonly referred to as an augmented gas or hybrid inflator.

Hybrid inflators that have been proposed heretofore are subject to certain disadvantages. They require glass-to-metal-seals or other complex sealing methods to maintain the high pressure seal and/or require an actuation means (mechanical or pyrotechnic) to open the flow passages to the air bag. Many hybrid inflator arrangements dispense cold inflating gas followed by heated gas. This is a disadvantage for an air bag driver system. Additionally, end diffusers typically used on hybrid inflators make packaging in modules difficult.

Thus, there is a need and a demand for improvement in hybrid inflators to the end of overcoming the foregoing disadvantages. The present invention was devised to fill the gap that has existed in the art in these respects.

SUMMARY OF THE INVENTION

An object of the invention is to provide a hybrid inflator that does not require glass-to-metal-seals or other complex sealing methods to maintain the high pressure seal.

Another object of the invention is to provide a hybrid inflator that does not require an actuation means (mechanical or pyrotechnic) to open the passages for the flow of inflation gas to the air bag.

A further object of the invention is to provide an air bag inflator which dispenses, in its entirety, heated gas to the air bag.

Still another object of the invention is to provide for use with such an improved hybrid inflator a centrally located diffuser that provides for easier packaging in modules compared to end diffusers that typically are used in hybrid inflators.

In accomplishing these and other objectives of the invention, there is provided a hybrid gas inflator including an enlongated generally cylindrical storage chamber for storing an inert gas under high pressure, for example, Argon or Nitrogen, at 2000 to 4000 pounds per square inch (psi). The hybrid gas inflator also includes a pyrotechnic heater having a combustion chamber which utilizes a granular mixture of Boron Potassium Nitrate ($BKNO_3$) or another suitable pyrotechnic material to heat the stored gas. A thin metal diaphragm, hereinafter termed a second diaphragm, is utilized to provide a pressure seal between the storage chamber and a diffuser for the inflator. The diffuser contains a plurality of gas orifices for dispensing gas uniformly into the air bag assembly. The gas storage chamber is sealed also from the combustion chamber of the pyrotechnic heater by a thin metal diaphragm hereinafter termed a "first diaphragm." This diaphragm is welded around the perimeter thereof to an end of the pyrotechnic heater housing and is backed up with a solid metal plug. The plug seats in an adjacent shoulder covering the nozzle orifice of the combustion chamber thereby providing support for the thin diaphragm across the entire surface thereof. This enables the diaphragm to withstand the loads of the high pressure gas being stored in the storage chamber.

The hybrid gas generator functions, as follows. Upon receiving a control signal, an initiator in the pyrotechnic heater fires, igniting the pyrotechnic charge ($BKNO_3$). As the pressure in the combustion chamber rises and exceeds the high pressure of the stored inert gas in the storage chamber, the plug is unseated. Subsequently, the first thin diaphragm ruptures since it is unsupported when the combustion pressure of the pyrotechnic heater exceeds the inert gas storage pressure. Hot gas and particles from the burning pyrotechnic material heat the stored gas causing a rapid pressure rise in the storage chamber. When the pressure in the storage chamber exceeds the structural capability of the second thin metal diaphragm in the diffuser, rupture thereof occur. This allows the heated gas to vent through the diffuser orifices into the air bag assembly. Located between the diffuser diaphragm and the storage chamber are one or more constricting orifices which throttle the flow of gas from the storage chamber and provide for the proper fill rate to the air bag assembly.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DESCRIPTION OF THE PREFERRED EMBODIMENT

Referring to the drawings, there is shown a hybrid inflator assembly 10 for inflating a vehicle occupant restraint such as an air bag. The inflator assembly 10 comprises a pressure vessel 12 including a storage chamber 14 that is filled and pressurized with an inert gas such as Argon or Nitrogen to a pressure typically in the range of 2000–4000 psi.

The chamber 14 is defined by an elongated cylindrical sleeve 16. A fill plug 18 is attached by a circumferential weld 20 in sealing relation to a first end 22 of sleeve 16. A pyrotechnic heater 24 is recessed in sealing relation into chamber 14 from a second end 26 of sleeve 16. A diffuser 28 extends at substantially a 90° angle from the exterior surface 30 of sleeve 16 at a location intermediate the ends 22 and 26 thereof. Diffuser 28 is arranged in sealing relation with sleeve 16 and provides a passage for the flow of gas from pressure chamber 14 through one or more normally closed constricting orifices 32 that are provided in the wall of sleeve 16.

Figure 1:
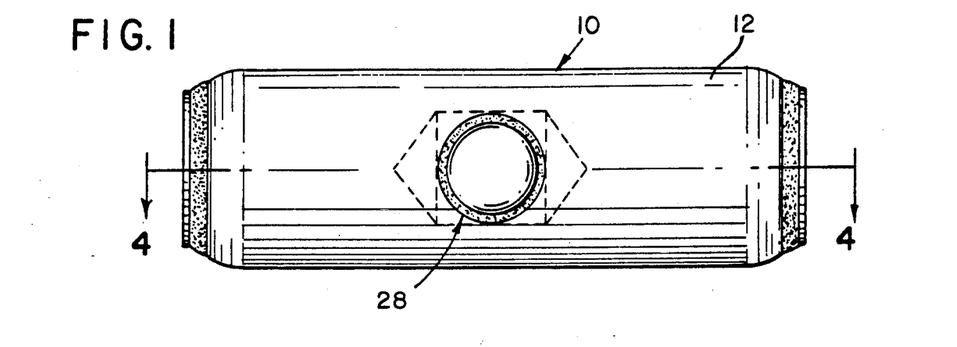
FIGS. 1, 2 and 3 are front, side and end views, respectively, illustrating the hybrid inflator of the present invention.
Figure 2:
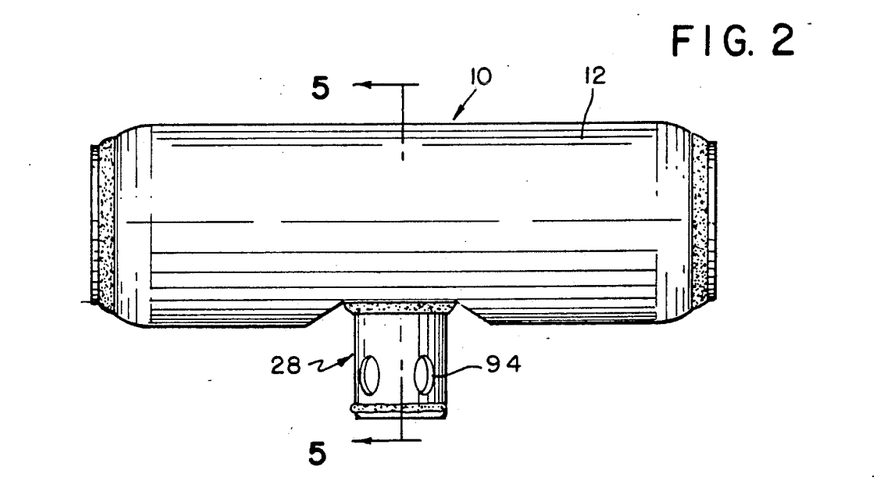
Figure 3:
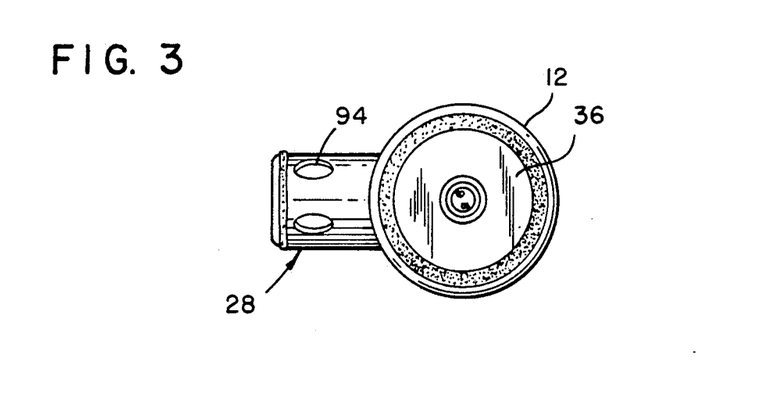
Figure 4:
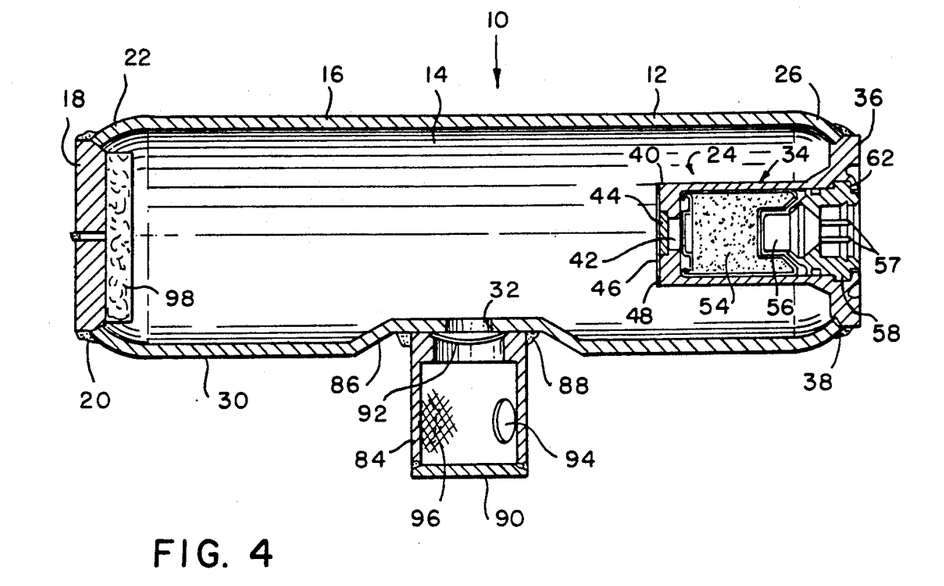
FIG. 4 illustrates a cross-sectional view of the hybrid inflator taken along the lines 4—4 of FIG. 1.
Figure 5:
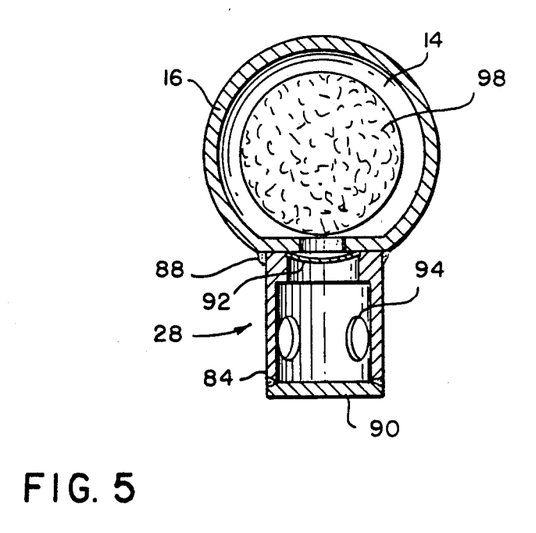
FIG. 5 is a cross-sectional view taken along the lines 5—5 of FIG. 2.
Figure 6:
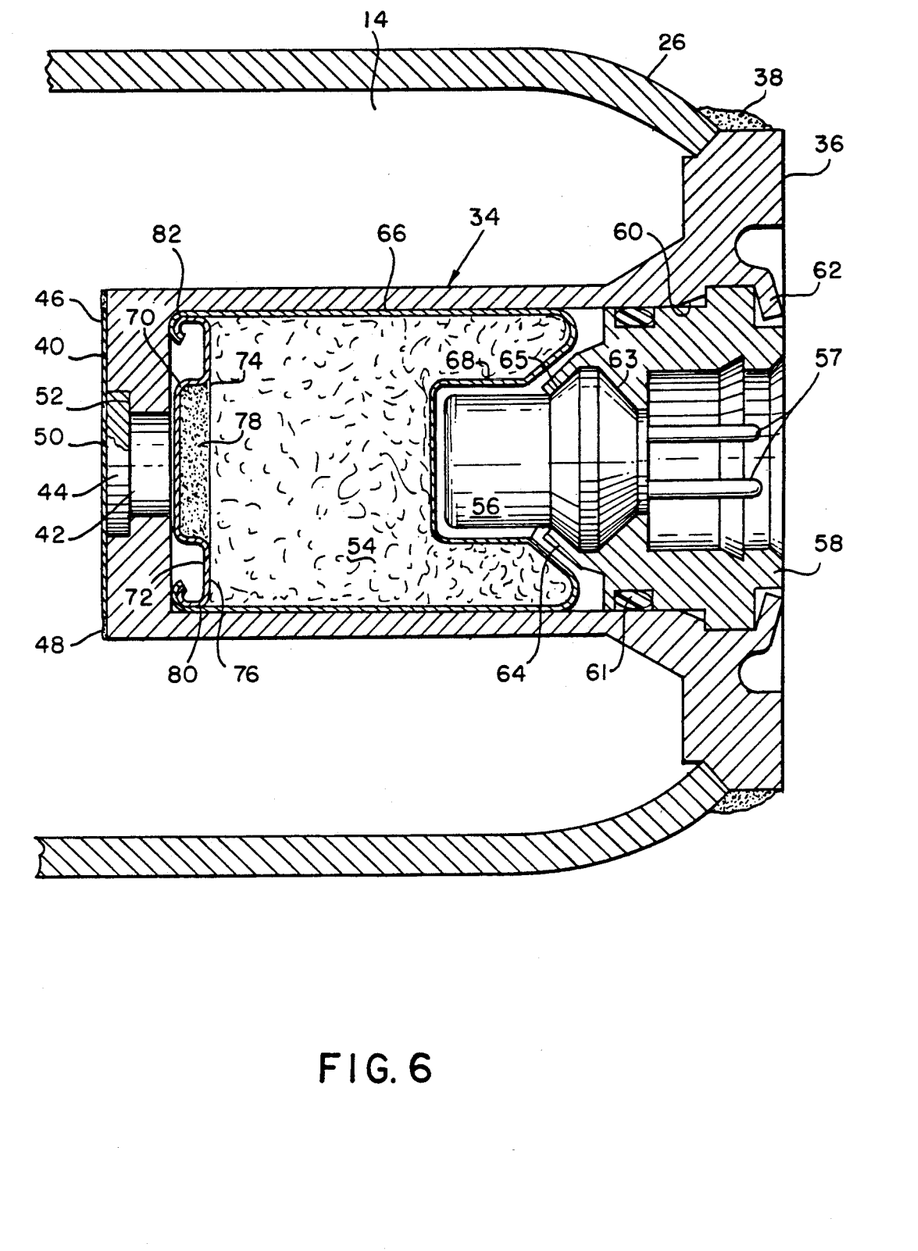
FIG. 6 is an enlarged fragmentary sectional view of a portion of the hybrid inflator sectional view shown in FIG. 4.

The pyrotechnic heater 24 comprises a housing 34 having an enlarged outer end 36 that mates with the second end 26 of sleeve 16. The sleeve 16 and the outer end 36 of housing 34 are joined in sealing relation at a circumferential weld 38. At the inner end 40 of housing 34 a central opening or nozzle orifice 42 is provided. Orifice 42 is normally covered by a solid metal plug 44 and a thin metal diaphragm 46, referred to herein as a first diaphragm. The diaphragm 46 is joined by a circumferential weld 48 at the periphery thereof in sealing relation to the inner end 40 of housing 34. The plug 44 provides back up support for the thin diaphragm 46 over the entire area thereof, thus enabling the thin diaphragm 46 to withstand the loads of the high pressure gas stored in chamber 14. To that end the surface 50 of plug 44 adjacent the diaphragm 46, as seen in FIGS. 4 and 6, is made to be flush with the inner end 40 of housing 34, with the plug 44 abutting a shoulder 52 adjacent nozzle orifice 42.

Contained within the pyrotechnic housing 34 is a pyrotechnic charge 54 of a granular mixture of $BKNO_3$ and an initiator 56. Initiator 56 is retained within housing 34 by a hollow generally cylindrical mounting adapter 58. Mounting adapter 58 is located in an opening 60 in a central location in the outer end 36 of housing 34, being sealed therein by an O-ring seal 61. A circumferential crimp 62 formed in the outer end 36 of housing 34 securely retains the mounting adapter 58 in opening 60. Electrical contact pins 57 connect initiator 56 to collision sensor means (not shown).

Initiator 56 has a conically shaped portion 63 in engagement with and matching a similarly shaped conical portion provided in the mounting adapter 58. Another portion of the mounting adapter 58 forms a crimp 64 over a reversed conical portion 65 of the initiator 56 thus retaining the latter securely within the opening 60.

Pyrotechnic charge 54 is contained within a generally cylindrical container 66 having a closed reentrant portion 68 into which the initiator 56 fits in close but non contacting relation. The other end of container 66 is closed by a hat shaped container 70. Container 70 includes a relatively wide brim 72 at the open end thereof that is sealed with an aluminum foil seal 74. Adhesive 76 may be provided for attaching seal 74 to the brim 72.

Container 70 contains an igniter material 78. For facilitating the insertion of container 70 into the open end of container 65 and for effecting a close engagement with the inner wall surface of the latter, the outer peripheral edge of the brim 72 desirably is rounded, as best seen in FIG. 6. Sealing between the containers 66 and 70 may be effected by a suitable sealant 80 such as silicone rubber properly cured in known manner. Desirably, the edge 82 of the open end of container 66 may be rounded inwardly, as shown, to conform to the shape of the inner wall of the pyrotechnic housing 34 with the surface of container 70 remote from foil seal 74 in good thermal contact with the inner end wall of housing 34 and the adjacent end of plug 44.

Although various pyrotechnic materials may be employed for pyrotechnic charge 54 in container 66, a preferred material is a granular mixture of 25% by weight of Boron and 75% of Potassium Nitrate. This mixture has been found to burn with hot flame that is suitable for heating the stored gas within chamber 16 according to the invention.

The igniter material 78 in container 70 may be any granule powder or other material which is stable for long periods at temperatures up to 250° F. (121° C.), will auto ignite at the desired temperature of approximately 350° F. (177° C.), and provide a hot gas effluent output sufficient to ignite the pyrotechnic charge 54 within container 66. An igniter material 78 that has been found to be satisfactory is du Pont 3031, a product of E. I. du Pont de Nemours & Co., Inc. of Wilmington, Delaware. Stability over long periods is needed because of the expected longevity of use, which may be ten (10) years or more of the vehicle in which the hybrid inflator 10 is installed.

The material of the housing of container 66 may be 0.010 to 0.020 inch (0.0254 to 0.0508 cm) aluminum or steel foil. Adhesive 76 must have high temperature adhesive properties up to the temperature of auto ignition.

The purpose of container 66 and the igniter material 78 contained therein is to rapidly ignite the inflator 10 once the auto ignition temperature of the granules of the igniter material 78 is reached. This result is facilitated through the arrangement of the igniter material 78 in intimate or close thermal contact with the wall of the pyrometric housing 34, with the hot gaseous output thereof, upon auto ignition, being directed into the pyrometric charge 54 in container 66.

Diffuser 28 comprises a generally cylindrical sleeve 84 that is joined at one end to the sleeve 16, at a depressed portion 86 of the surface 30 thereof in which the orifice 32 is provided, by a circumferential weld 88. The other end of sleeve 84 is joined to and sealed by a gas impervious closure plate 90. A thin metal diaphragm 92, referred to hereinafter as a second diaphragm, provides a seal for orifice 32 in the wall of sleeve 16 which defines storage chamber 14. Provided in sleeve 84 of diffuser 28 are a plurality of orifices 94 for dispensing inflating gas uniformly from chamber 14 into an air bag assembly (not shown).

A coarse screen or perforated metal sheet indicated at 96 is provided in the diffuser 28 to cover the diffuser orifices 94 to prevent fragments of the diaphragms from entering the air bag assembly. If filtering is desired, the coarse screen 96 could be replaced with a filter assembly of wraps of metal and/or ceramic fiber materials which are common in the art.

Further filtering is achieved by placing impingement filter material indicated at 98 on the inside surface of the fill port end plug 18 opposite the central opening 42 or nozzle of the pyrotechnic heater 24. Filter 98 would be made with woven or matted metal and/or ceramic fibers which functions by providing a large surface area upon which liquid phased particulates entrained in the impinging gases may condense.

If required, a pressure monitoring device (not shown) may be included on the fill port end plug 18.

In the operation of the hybrid gas generator, upon receiving an electric signal indicative of the onset of a crash, that is, a need for inflation of the air bag, the initiator 56 in the pyrotechnic heater 24 fires, igniting the pyrotechnic charge 54. As the pressure in the combustion chamber contained within container 66 rises and exceeds the high pressure of the stored gas in chamber 14, the plug 44 closing the central orifice 42 in the pyrotechnic housing 34 is unseated. Subsequently, the thin diaphragm 46 ruptures since it is unsupported when the combustion pressure of the pyrotechnic heater 24 exceeds the gas storage pressure in chamber 14. Hot gas and particulates from the burning pyrotechnic charge 54 heat the stored gas causing a rapid pressure rise in the storage chamber. When the storage pressure exceeds the structural capability of the thin metal diaphragm 92 in the diffuser 28, it ruptures allowing the heated gas to vent through the diffuser orifices 94 into the air bag assembly. Between the diffuser diaphragm 92 and the storage chamber 14 are one or more constricting orifices 32 which throttle the flow of gas from the storage chamber 14, providing the proper fill rate to the air bag. The coarse screen or perforated metal sheet 96 prevents fragments of the diaphragms 46 and 92 from entering the air bag assembly. Impingement filter 98 on the fill port end plug 18 provides further filtering by condensing thereon liquid phase particles entrained in the impinging gases.

Figure 7:
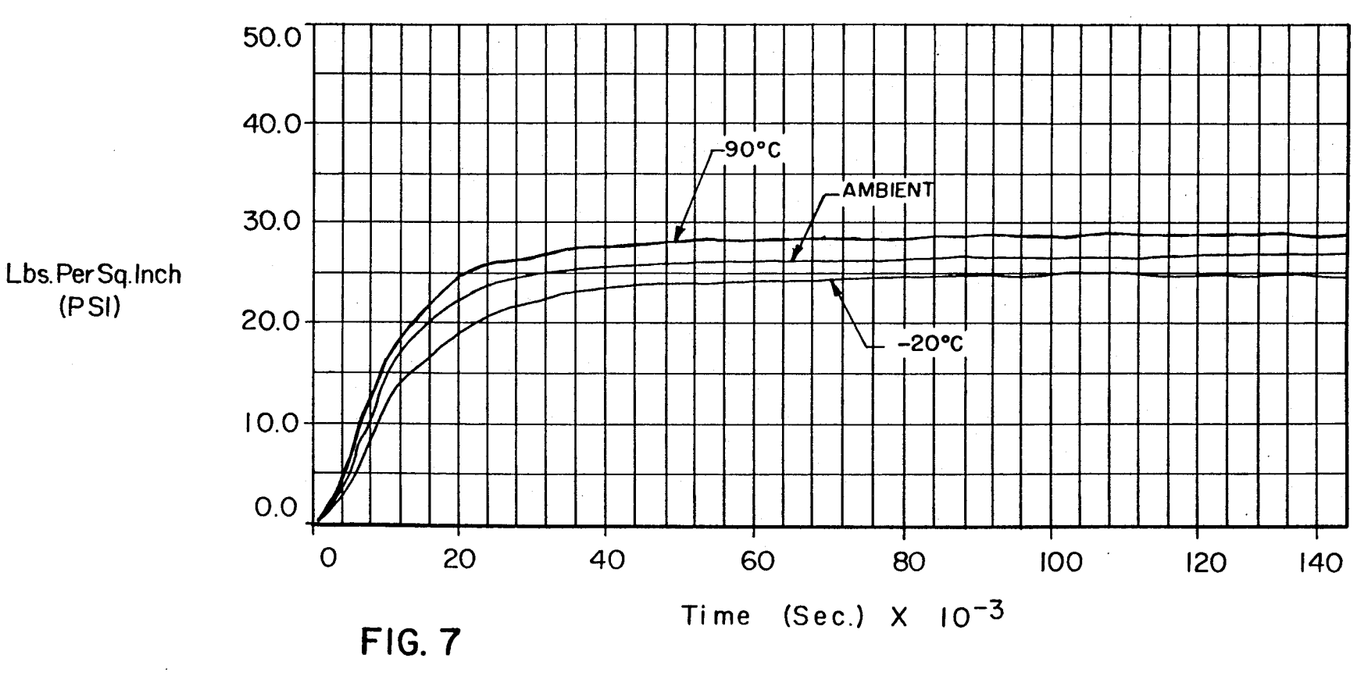
FIG. 7 shows hot, ambient and cold tank performances of the hybrid inflator.

FIG. 7 illustrates hot, ambient and cold tank performances of the hybrid inflator 10.

Figure 8:
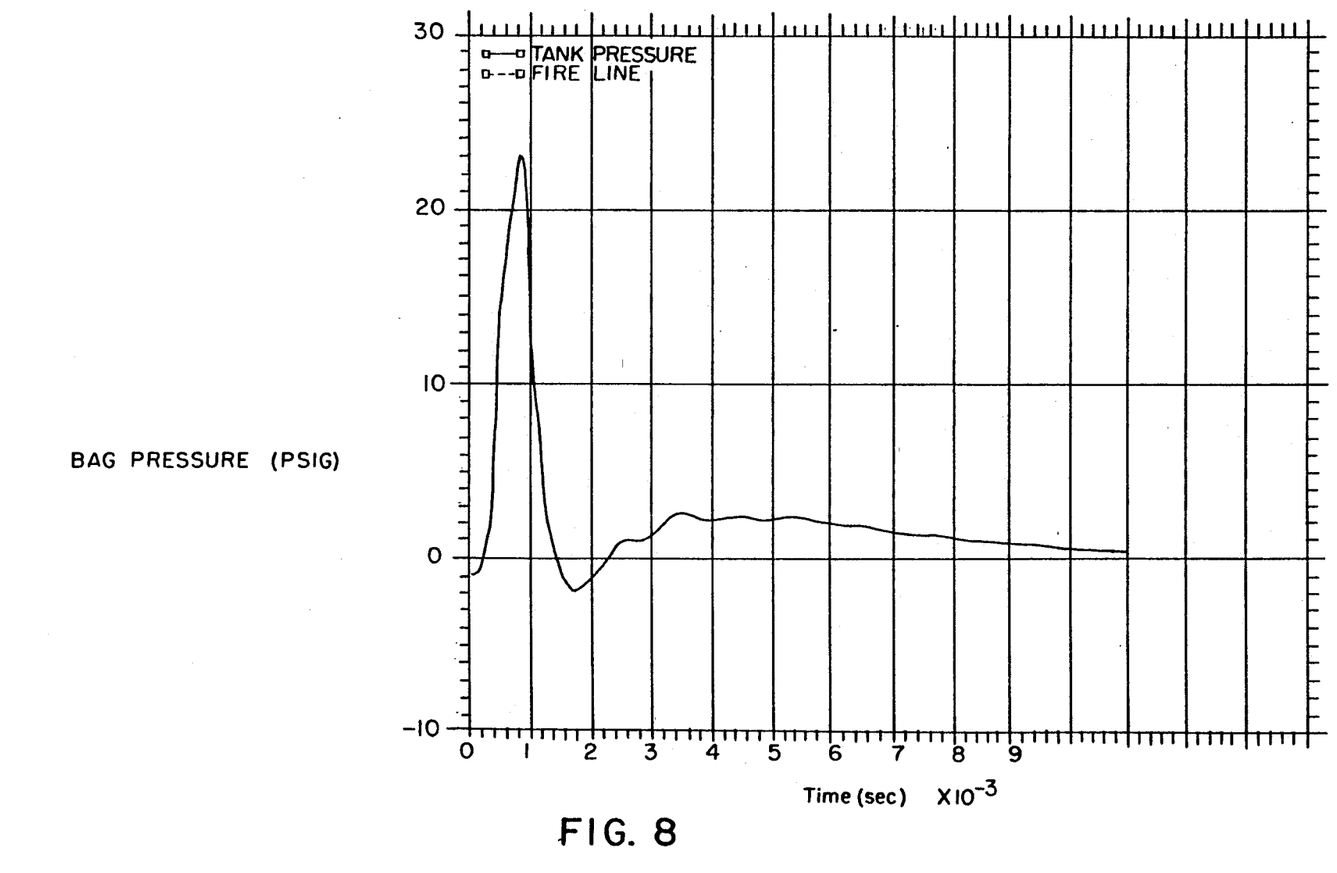
FIG. 8 shows an ambient air bag deployment pressure trace.
Figure 9:
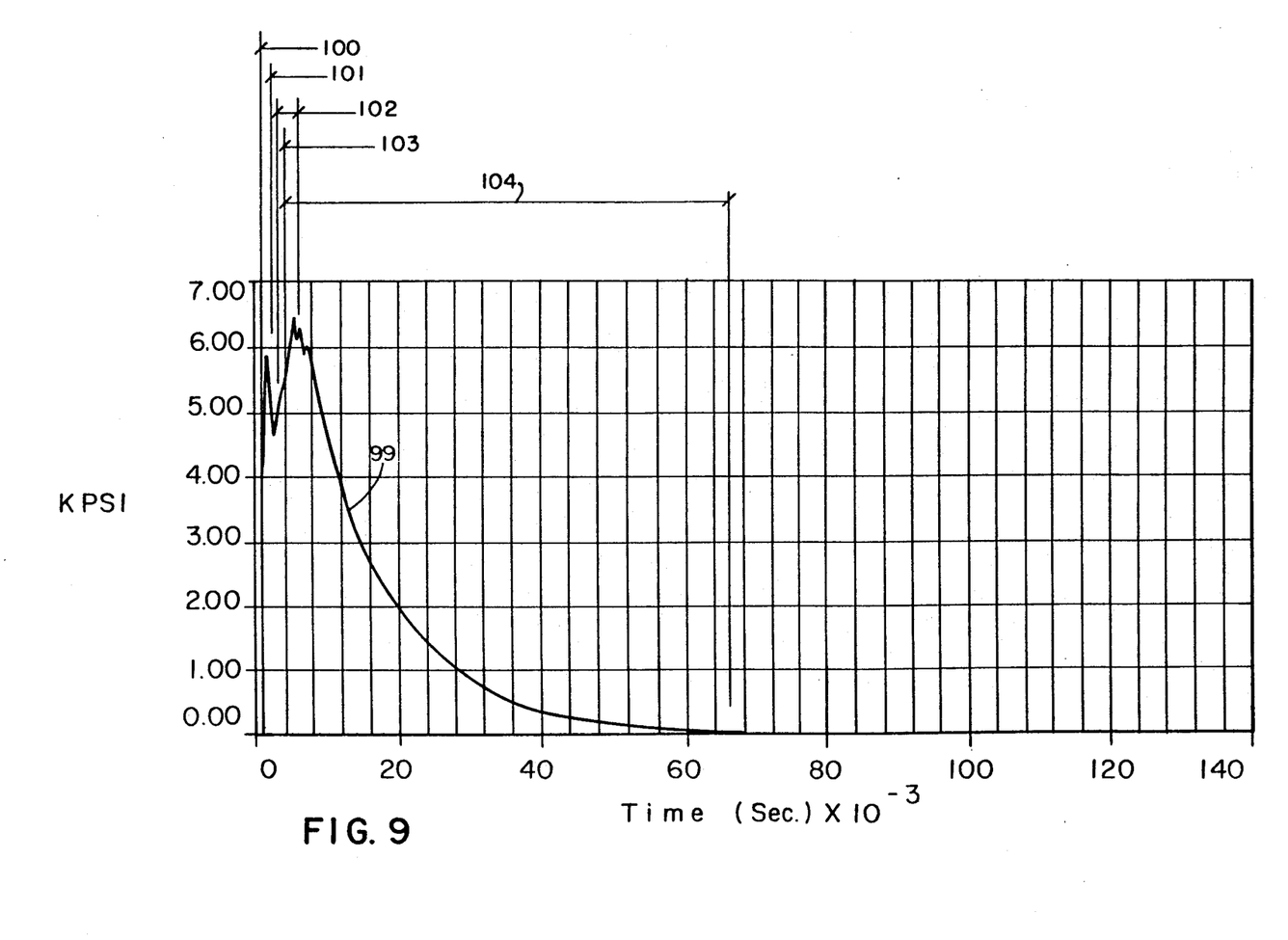
FIG. 9 shows an ambient combustion pressure trace.

FIG. 8 shows an ambient air bag deployment pressure trace of the hybrid inflator 10; and FIG. 9 shows an ambient combustion pressure trace of the hybrid inflator 10.

In FIG. 9, position 100 on the trace 99 indicates that the ignition signal has been received and that the initiator has fired. Reference numeral 101 shows that the combustion pressure in pyrotechnic heater 24 exceeds the stored gas pressure. Numeral 102 shows the heating period of the stored gas in the storage chamber 14. Numeral 103 indicates that the second diaphragm 92 has ruptured, releasing the heated gas in storage chamber 14. Numeral 104 indicates the period of gas venting from chamber 14.

Thus, in accordance with the invention, there has been provided an improved hybrid inflator that does not require glass-to-metal-seals or other complex sealing methods to maintain the high pressure seal of the compressed inert gas storage chamber. Nor does the improved hybrid inflator require an actuation means (mechanical or pyrotechnic) to open the flow passages from the compressed gas storage chamber to the air bag. The improved hybrid inflator of the invention, moreover, is characterized in dispensing, in its entirety, heated gas to the air bag. Additionally, the improved hybrid inflator features a centrally located diffuser that provides for easier packaging in modules compared to end diffusers typically used on hybrid inflators.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. A hybrid inflator for an air bag comprising,
   a storage chamber for storing inflation gas under high pressure, said storage chamber being formed by a hollow cylindrical sleeve that is closed at one end and open at an opposite end,
   a pyrotechnic heater closing said opposite end of said sleeve, said pyrotechnic heater being recessed into said sleeve and including a combustion chamber having a pyrotechnic charge therein, a nozzle orifice, a solid plug means abutting a shoulder adjacent said nozzle orifice, and a first diaphragm,
   a diffuser having a plurality of orifices for dispensing inflation gas from said storage chamber uniformly into an air bag, and
   a second diaphragm,
   said storage chamber being sealed from said diffuser by said second diaphragm and being further sealed from said combustion chamber by said first diaphragm backed up by said solid plug means against the high pressure of the inflation gas stored in said storage chamber,
   whereby as the pressure in the combustion chamber rises and exceeds the pressure of the stored inflation gas in said storage chamber upon ignition of said pyrotechnic charge, said solid plug is unseated with said first diaphragm subsequently rupturing since it is unsupported when the pressure in said combustion chamber exceeds the pressure in the storage chamber, and hot gas from the burning pyrotechnic charge heats the stored inflation gas in said storage chamber causing a rapid pressure rise therein so that when the pressure in said storage chamber exceeds the structural capability of said second diaphragm rupture of the latter occurs allowing the heated gas to vent through said diffuser orifices into an air bag.

2. A hybrid inflator as defined by claim 1 wherein each of said first and second diaphragms is made of a thin metal.

3. A hybrid inflator as defined by claim 1 wherein said hollow cylindrical sleeve is closed at said one end by a fill plug means.

4. A hybrid inflator as defined by claim 3 wherein each of said fill plug means and said solid plug means is made of metal.

5. A hybrid inflator as defined by claim 3 wherein said fill plug means is welded in sealing relation to said one end of said sleeve and said pyrotechnic heater is welded to the other end of said sleeve in sealing relation.

6. A hybrid inflator as defined by claim 1 wherein said first diaphragm is welded around the perimeter thereof to said pyrotechnic heater in sealing relation to said nozzle orifice.

7. A hybrid inflator as defined by claim 1 further including orifice covering means positioned internally of said diffuser to prevent fragments of the diaphragms from entering the air bag.

8. A hybrid inflator as defined by claim 8 wherein said orifice covering means comprises a coarse screen or perforated metal sheet positioned inside the diffuser to cover the diffuser orifices.

9. A hybrid inflator as defined by claim 1 further including inside said diffuser a filter assembly of wraps of metal and/or ceramic fiber materials.

10. A hybrid inflator as defined by claim 1 wherein said pyrotechnic heater further includes an initiator for igniting said pyrotechnic charge in said combustion chamber, said initiator being operative, upon receiving an electric signal indicative of the need for inflation of the air bag, to ignite said pyrotechnic charge.

11. A hybrid inflator as defined by claim 1 wherein said pyrotechnic heater further includes in said combustion chamber auto ignition means including auto ignition material having an ignition temperature below an ignition temperature of said pyrotechnic charge.

12. A hybrid inflator for an air bag comprising,
a storage chamber for storing inflation gas under high pressure, said storage chamber being formed by a hollow cylindrical sleeve that is closed at one end and open at an opposite end, wherein said hollow cylindrical sleeve is closed at sad one end by a fill plug means,
a pyrotechnic heater closing said opposite end of said sleeve, said pyrotechnic heater being recessed into said sleeve and including a combustion chamber having a pyrotechnic charge therein, a nozzle orifice, a solid plug means abutting a shoulder adjacent said nozzle orifice, and a first diaphragm,
wherein said fill plug means is welded in sealing relation to said one end of said sleeve and said pyrotechnic heater is welded to the other end of said sleeve in sealing relation,
a diffuser having a plurality of orifices for dispensing inflation gas from said storage chamber uniformly into an air bag, and
a second diaphragm,
said storage chamber being sealed from said diffuser by said second diaphragm and being further sealed from said combustion chamber by said first diaphragm backed up by said solid plug means against the high pressure of the inflation gas stored in said storage chamber,
wherein said diffuser includes a cylindrical housing having a first end closed off by a plate that is welded in sealing relation thereto and having a second end welded to a portion of said sleeve intermediate the ends thereof with said second diaphragm positioned between said sleeve and the second end of said diffuser housing,
whereby as the pressure in the combustion chamber rises and exceeds the pressure of the stored inflation gas in said storage chamber upon ignition of said pyrotechnic charge, said solid plug is unseated with said first diaphragm subsequently rupturing since it s unsupported when the pressure in said combustion chamber exceeds the pressure in the storage chamber, and hot gas from the burning pyrotechnic charge heats the stored inflation gas in said storage chamber causing a rapid pressure rise therein so that when the pressure in said storage chamber excess the structural capability of said second diaphragm rupture of the latter occurs allowing the heated gas to vent through said diffuser orifices into an air bag.

13. A hybrid inflator as defined by claim 9 further including at least one constricting orifice in the wall of said sleeve between said storage chamber and said second diaphragm for throttling the flow of gas from the storage chamber upon rupture of said second diaphragm.

14. A hybrid inflator for an air bag comprising,
a storage chamber for storing inflation gas under high pressure, said storage chamber being formed by a hollow cylindrical sleeve that is closed at one end and open at an opposite end,
a pyrotechnic heater closing said opposite end of said sleeve, said pyrotechnic heater being recessed into said sleeve and including a combustion chamber having a pyrotechnic charge therein, a nozzle orifice, a solid plug means abutting a shoulder adjacent said nozzle orifice, and a first diaphragm,
a diffuser having a plurality of orifices for dispensing inflation gas from said storage chamber uniformly into an air bag, and
a second diaphragm,
said storage chamber being sealed from said diffuser by said second diaphragm and being further sealed from said combustion chamber by said first diaphragm backed up by said solid plug means against the high pressure of the inflation gas stored in said storage chamber,
wherein said diffuser includes a cylindrical housing that is closed at one end and is so attached in sealing relation, at the other end thereof, to a portion of said sleeve intermediate the ends thereof as to extend from said sleeve at substantially a 90° angle,
whereby as the pressure in the combustion chamber rises and exceeds the pressure of the stored inflation gas in said storage chamber upon ignition of said pyrotechnic charge, said solid plug is unseated with said first diaphragm subsequently rupturing since it is unsupported when the pressure in said combustion chamber exceeds the pressure in the storage chamber, and hot gas from the burning pyrotechnic charge heats the stored inflation gas in said storage chamber causing a rapid pressure rise therein so that when the pressure in said storage chamber exceeds the structural capability of said second diaphragm rupture of the latter occurs allowing the heated gas to vent through said diffuser orifices into an air bag.

* * * * *

UNITED STATES PATENT AND TRADEMARK OFFICE
CERTIFICATE OF CORRECTION

PATENT NO. : 5,290,060
DATED : March 1, 1994
INVENTOR(S) : Bradley W. Smith

It is certified that error appears in the above-identified patent and that said Letters Patent is hereby corrected as shown below:

At column 6, line 65, "claim 8" should be -- claim 7 --.

At column 8, line 9, "claim 9" should be -- claim 12 --.

Signed and Sealed this

Thirteenth Day of September, 1994

Attest:

BRUCE LEHMAN

*Attesting Officer*       *Commissioner of Patents and Trademarks*